US010177920B2

(12) United States Patent
Ohara

(10) Patent No.: US 10,177,920 B2
(45) Date of Patent: Jan. 8, 2019

(54) SERVER APPARATUS AND COMMUNICATION SYSTEM COMPRISING SERVER APPARATUS

(71) Applicant: Brother Kogyo Kabushiki Kaisha, Nagoya-shi, Aichi-ken (JP)

(72) Inventor: Kiyotaka Ohara, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 187 days.

(21) Appl. No.: 15/198,348

(22) Filed: Jun. 30, 2016

(65) Prior Publication Data

US 2017/0093583 A1 Mar. 30, 2017

(30) Foreign Application Priority Data

Sep. 30, 2015 (JP) .................................. 2015-193201

(51) Int. Cl.
*H04L 9/32* (2006.01)
*H04L 9/30* (2006.01)
(Continued)

(52) U.S. Cl.
CPC .............. *H04L 9/3263* (2013.01); *H04L 9/14* (2013.01); *H04L 9/30* (2013.01); *H04L 63/0442* (2013.01);
(Continued)

(58) Field of Classification Search
CPC . H04L 9/3263; H04L 63/123; H04L 63/0442; H04L 63/0823; H04L 9/30; H04L 9/14
See application file for complete search history.

(56) References Cited

U.S. PATENT DOCUMENTS 5,131,038 A * 7/1992 Puhl ........................ G06F 21/35
  235/380
6,351,618 B1 * 2/2002 Pollocks, Jr. ...... G03G 21/1892
  399/12
(Continued)

FOREIGN PATENT DOCUMENTS

JP 2001-347734 A 12/2001
JP 2002-297548 A 10/2002
(Continued)

*Primary Examiner* — David Garcia Cervetti
(74) *Attorney, Agent, or Firm* — Banner & Witcoff, Ltd.

(57) ABSTRACT

A server apparatus receives unique information, encrypted information and user information from an information processing apparatus via a network interface, the unique information being information which is uniquely assigned to an image processing apparatus, the encrypted information being information into which the unique information is encrypted using a first key, and the user information being information related to a user of the image processing apparatus; decrypts the received encrypted information using a second key corresponding to the first key so as to obtain decrypted information; determines whether the decrypted information and the received unique information represent same information; and stores, in the memory, the received user information and the received unique information in association in a case where it is determined that the decrypted information and the received unique information represent the same information.

24 Claims, 6 Drawing Sheets

(51) Int. Cl.
*H04L 9/14* (2006.01)
*H04L 29/06* (2006.01)

(52) U.S. Cl.
CPC ........ *H04L 63/0823* (2013.01); *H04L 63/123* (2013.01)

(56) References Cited

U.S. PATENT DOCUMENTS

| | | | | |
|---|---|---|---|---|
| 6,351,621 B1* | 2/2002 | Richards | ............. | B41J 2/17503 399/111 |
| 6,738,903 B1* | 5/2004 | Haines | ................. | B41J 2/17509 380/22 |
| 7,162,644 B1* | 1/2007 | Trimberger | ......... | G06F 12/1425 326/8 |
| 7,454,780 B2* | 11/2008 | Katsube | ................. | G06F 21/31 726/27 |
| 7,853,799 B1* | 12/2010 | Trimberger | ............. | G06F 21/76 380/277 |
| 8,689,300 B2* | 4/2014 | Sims | ................... | H04L 63/0823 713/154 |
| 9,256,763 B2* | 2/2016 | Gajek | ................... | H04L 9/0866 |
| 9,792,439 B2* | 10/2017 | Colnot | ................. | G06F 21/575 |
| 9,881,161 B2* | 1/2018 | Jang | ...................... | G06F 21/575 |
| 2002/0144118 A1* | 10/2002 | Maruyama | ............ | H04L 63/045 713/170 |
| 2002/0169972 A1* | 11/2002 | Tanaka | ............. | G11B 20/00086 713/193 |
| 2004/0128252 A1* | 7/2004 | Shirai | ..................... | G06F 21/10 705/59 |
| 2004/0181681 A1* | 9/2004 | Salisbury | ............. | B41J 2/17546 713/170 |
| 2005/0005141 A1* | 1/2005 | Nagai | .............. | G11B 20/00086 713/193 |
| 2005/0088279 A1* | 4/2005 | Denison | ............. | G07C 9/00309 340/5.23 |
| 2005/0105721 A1* | 5/2005 | Ono | ....................... | G03G 15/50 380/51 |
| 2005/0132189 A1* | 6/2005 | Katsube | .................. | G06F 21/31 713/168 |
| 2006/0136989 A1* | 6/2006 | Rodriguez | ............ | G06F 21/445 726/2 |
| 2006/0153578 A1* | 7/2006 | May | .................... | G03G 21/1882 399/12 |
| 2006/0192993 A1* | 8/2006 | Omotani | .............. | B41J 2/17503 358/1.15 |
| 2006/0250644 A1* | 11/2006 | Yamauchi | ............ | G06F 21/62 358/1.15 |
| 2006/0279588 A1* | 12/2006 | Yearworth | ............. | B41J 29/393 347/6 |
| 2007/0095927 A1* | 5/2007 | Pesonen | ............. | G06Q 20/3558 235/492 |
| 2008/0072068 A1* | 3/2008 | Wang | .................... | G06F 21/572 713/191 |
| 2008/0130899 A1* | 6/2008 | Iwamoto | ............... | H04L 63/062 380/278 |
| 2009/0219559 A1* | 9/2009 | Lee | .................... | G03G 15/5066 358/1.14 |
| 2009/0265539 A1* | 10/2009 | Koyasu | ................ | H04L 9/0838 713/150 |
| 2010/0017840 A1* | 1/2010 | Akins, III | ............ | H04N 7/1675 725/131 |
| 2010/0028031 A1* | 2/2010 | Lee | ........................ | G03G 21/20 399/44 |
| 2010/0033300 A1* | 2/2010 | Brandin | .................. | G06F 21/31 340/5.8 |
| 2010/0058066 A1* | 3/2010 | Wang | ...................... | G06F 21/80 713/183 |
| 2010/0217719 A1* | 8/2010 | Olsen | ...................... | B26D 5/00 705/318 |
| 2011/0093702 A1* | 4/2011 | Eom | .................... | G03G 15/553 713/168 |
| 2011/0128567 A1* | 6/2011 | Cachia | ................. | B41J 2/17546 358/1.14 |
| 2011/0176817 A1* | 7/2011 | Kim | ....................... | G03G 21/12 399/12 |
| 2012/0062950 A1* | 3/2012 | Lee | .................... | G03G 15/0863 358/1.15 |
| 2012/0222094 A1* | 8/2012 | Huebler | .................. | G06F 21/44 726/4 |
| 2013/0063770 A1* | 3/2013 | Lee | .................... | G03G 21/1882 358/1.15 |
| 2013/0155459 A1* | 6/2013 | Jeong | ................. | G06K 15/4005 358/1.15 |
| 2013/0321853 A1* | 12/2013 | Lee | .................... | G03G 21/1882 358/1.14 |
| 2014/0056599 A1* | 2/2014 | Spink | ..................... | G03G 15/55 399/12 |
| 2014/0082373 A1* | 3/2014 | Colnot | .................. | G06F 21/575 713/193 |
| 2014/0164725 A1* | 6/2014 | Jang | ...................... | G06F 21/575 711/163 |
| 2014/0164753 A1* | 6/2014 | Lee | ........................ | G06F 21/575 713/2 |
| 2014/0258709 A1* | 9/2014 | Takeda | ................ | H04L 63/0823 713/156 |
| 2015/0089630 A1* | 3/2015 | Lee | ........................ | G06F 21/44 726/16 |
| 2016/0124344 A1* | 5/2016 | Kojo | ................. | G03G 15/0863 399/12 |
| 2017/0011221 A1* | 1/2017 | Green | .................... | G06Q 30/06 |

FOREIGN PATENT DOCUMENTS

| | | |
|---|---|---|
| JP | 2003-337868 A | 11/2003 |
| JP | 2006-330881 A | 12/2006 |
| JP | 2012-191270 A | 10/2012 |

* cited by examiner

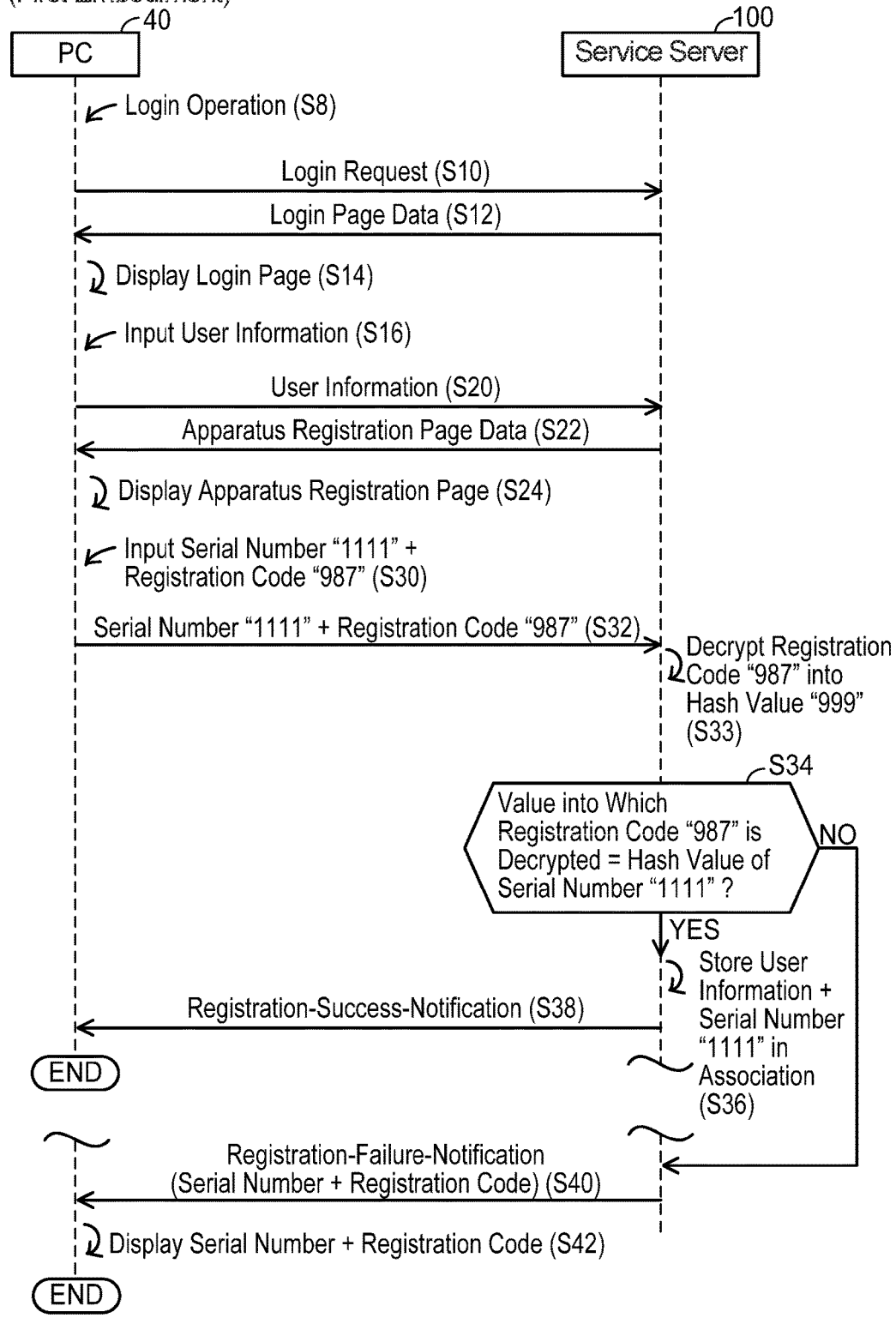

FIG. 3 (First and Second Embodiments)
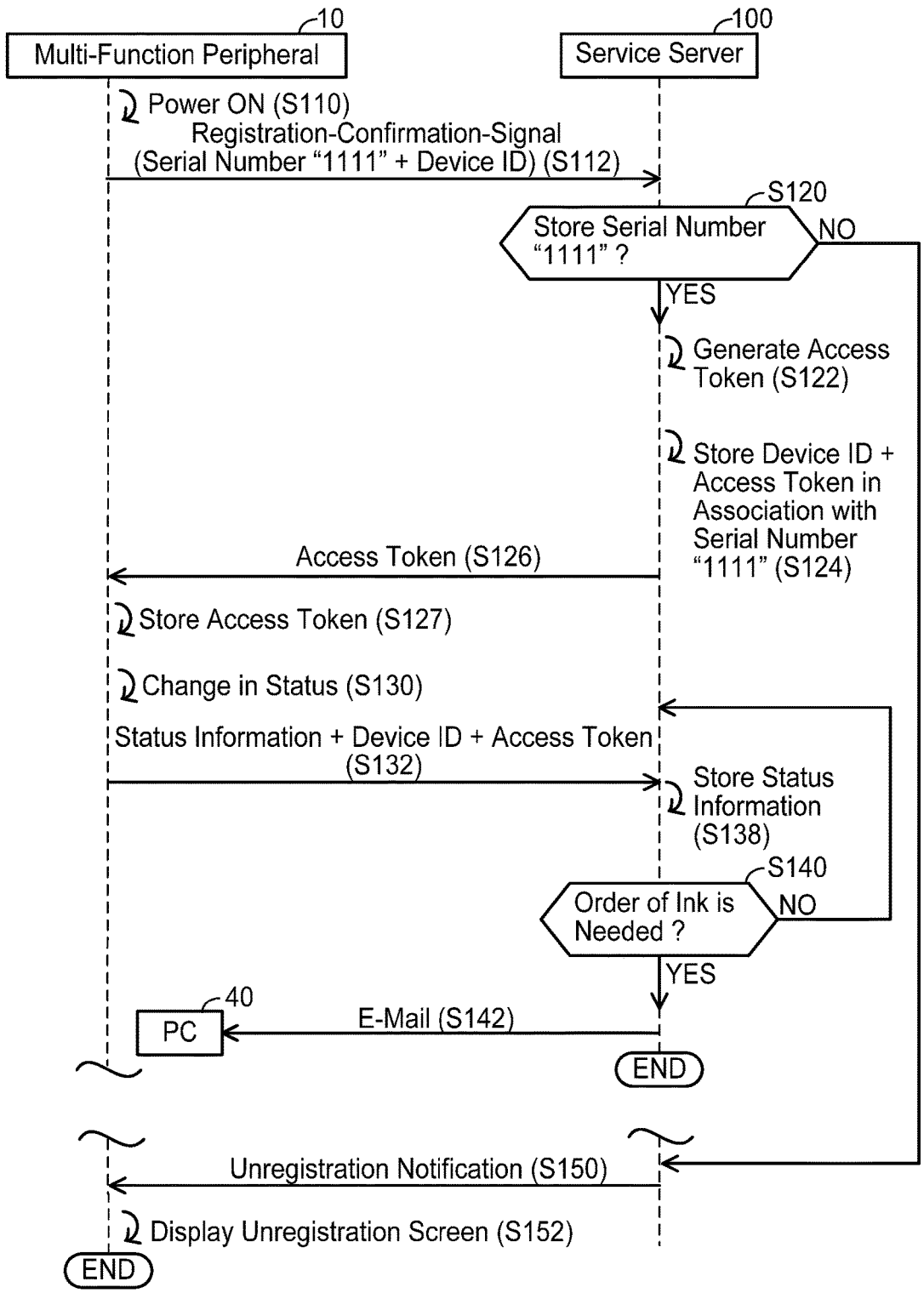

FIG. 4A (Second Embodiment)
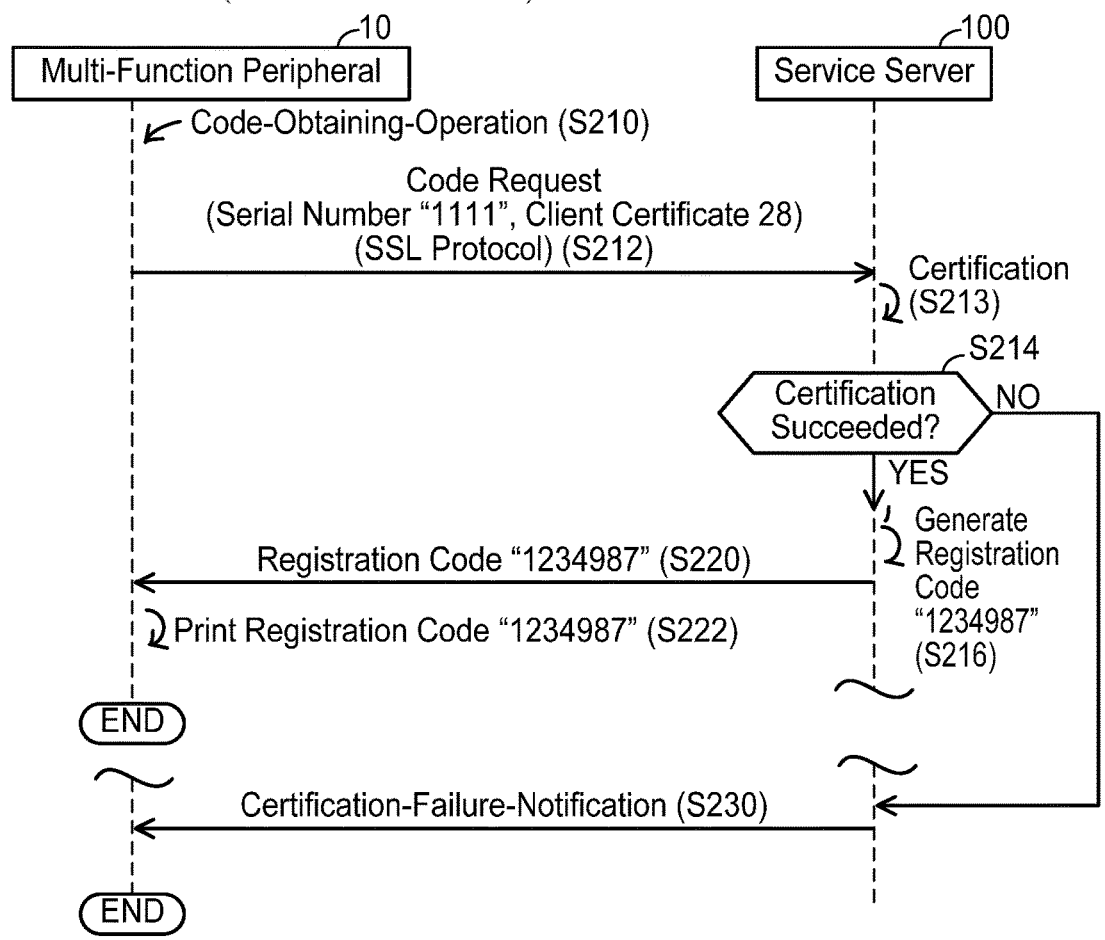
FIG. 4B
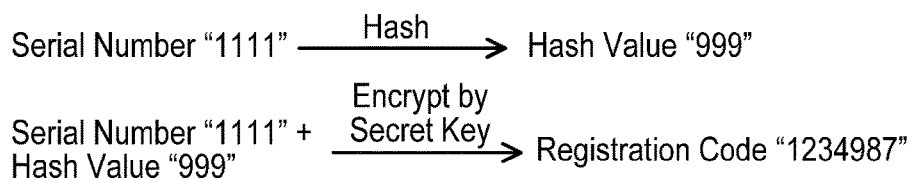

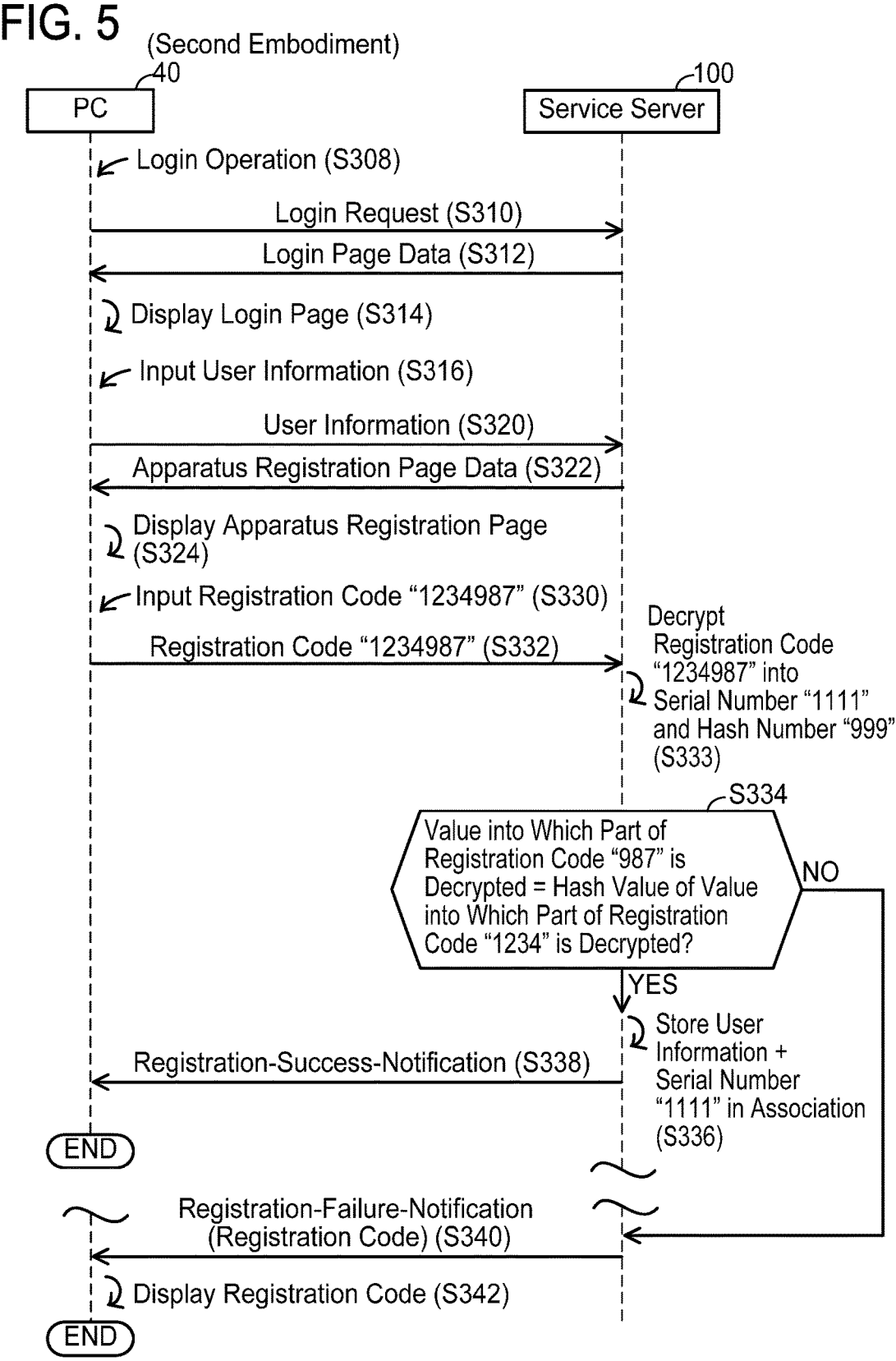

FIG. 6A    (Comparative Embodiment)
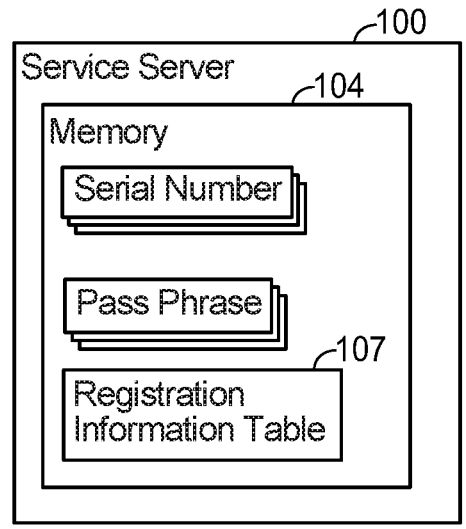
FIG. 6B
(First Embodiment)
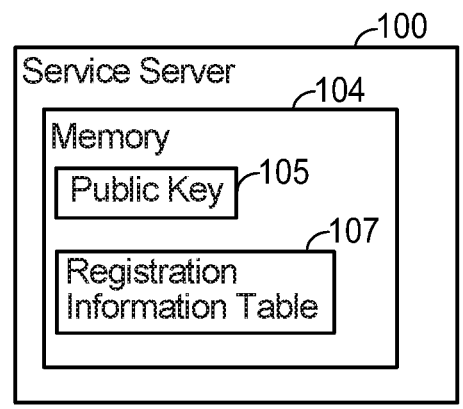

SERVER APPARATUS AND COMMUNICATION SYSTEM COMPRISING SERVER APPARATUS

CROSS-REFERENCE TO RELATED APPLICATION

This application claims priority to Japanese Patent Application No. 2015-193201, filed on Sep. 30, 2015, the entire contents of which are hereby incorporated by reference into the present application.

TECHNICAL FIELD

The technique disclosed in the present specification relates to a server apparatus that stores user information and unique information of an image processing apparatus in association, and a communication system comprising the server apparatus.

DESCRIPTION OF RELATED ART

An authenticating proxy server that registers an apparatus ID of a CE (abbreviation of Consumer Electronics) apparatus and user information in association, is known. The CE apparatus stores the apparatus ID and a pass phrase in advance. At the time of manufacturing the CE apparatus, the authenticating proxy server stores information including the apparatus ID of the CE apparatus, the pass phrase, etc. in a database. In order to register the user information input by a user in the authenticating proxy server, the CE apparatus sends the user information, the stored apparatus ID, and the pass phrase to the authenticating proxy server. When receiving the user information, the apparatus ID, and the pass phrase, in a case of already having stored information including the received apparatus ID and the pass phrase, the authenticating proxy server registers the apparatus ID and the user information in association.

SUMMARY

In the aforementioned technique, the authenticating proxy server stores the apparatus ID and the pass phrase in advance in a memory in order to confirm that the information including the received apparatus ID and the pass phrase has already been stored. However, in the case of this type of configuration, there is the problem that load on the memory of the authenticating proxy server increases. In the present specification, a technique is disclosed for reducing the load on the memory of the server apparatus when user information and unique information are to be stored in association in the server apparatus.

To achieve this object, a server apparatus disclosed in the present application may comprise a network interface configured to execute a communication with an information processing apparatus and an image processing apparatus; a processor; and a memory storing computer-readable instructions therein, the computer-readable instructions, when executed by the processor, causing the server apparatus to perform: receiving unique information, encrypted information and user information from the information processing apparatus via the network interface, the unique information being information which is uniquely assigned to the image processing apparatus, the encrypted information being information into which the unique information is encrypted using a first key, and the user information being information related to a user of the image processing apparatus; decrypting the received encrypted information using a second key corresponding to the first key so as to obtain decrypted information; determining whether the decrypted information and the received unique information represent same information; and storing, in the memory, the received user information and the received unique information in association in a case where it is determined that the decrypted information and the received unique information represent the same information.

Another server apparatus disclosed in the present specification may comprise a network interface configured to execute a communication with an information processing apparatus and an image processing apparatus; a processor; and a memory storing computer-readable instructions therein, the computer-readable instructions, when executed by the processor, causing the server apparatus to perform: receiving encrypted information and user information from the information processing apparatus via the network interface, the encrypted information being information into which unique information and additional information are encrypted using a first key, the unique information being information which is uniquely assigned to the image processing apparatus, and the user information being information related to a user of the image processing apparatus; decrypting the received encrypted information using a second key corresponding to the first key so as to obtain the unique information and the additional information; determining whether the decrypted unique information and the decrypted additional information represent same information; and storing, in the memory, the received user information and the decrypted unique information in association in a case where it is determined that the decrypted unique information and the decrypted additional information represent the same information.

Moreover, the technique disclosed in the present specification can be implemented in various aspects, such as a server apparatus, a control method of the server apparatus, a control apparatus for controlling the server apparatus, a control method, a storage medium for storing a control program, a communication system or the like that includes the server apparatus and at least one other apparatus (e.g., information processing apparatus, image processing apparatus), etc.

BRIEF DESCRIPTION OF DRAWINGS

FIG. 2 is a sequence chart of a temporary registration process of a first embodiment;

FIG. 3 is a sequence chart of a main registration process of first and second embodiments;

FIG. 4A is a sequence chart of a registration code receiving process of the second embodiment;

FIG. 4B is a diagram representing how a registration code is generated;

FIG. 5 is a sequence chart of a temporary registration process of the second embodiment;

FIG. 6A shows a service server of a comparative embodiment; and

FIG. 6B shows a service server of the first embodiment.

Figure 1:
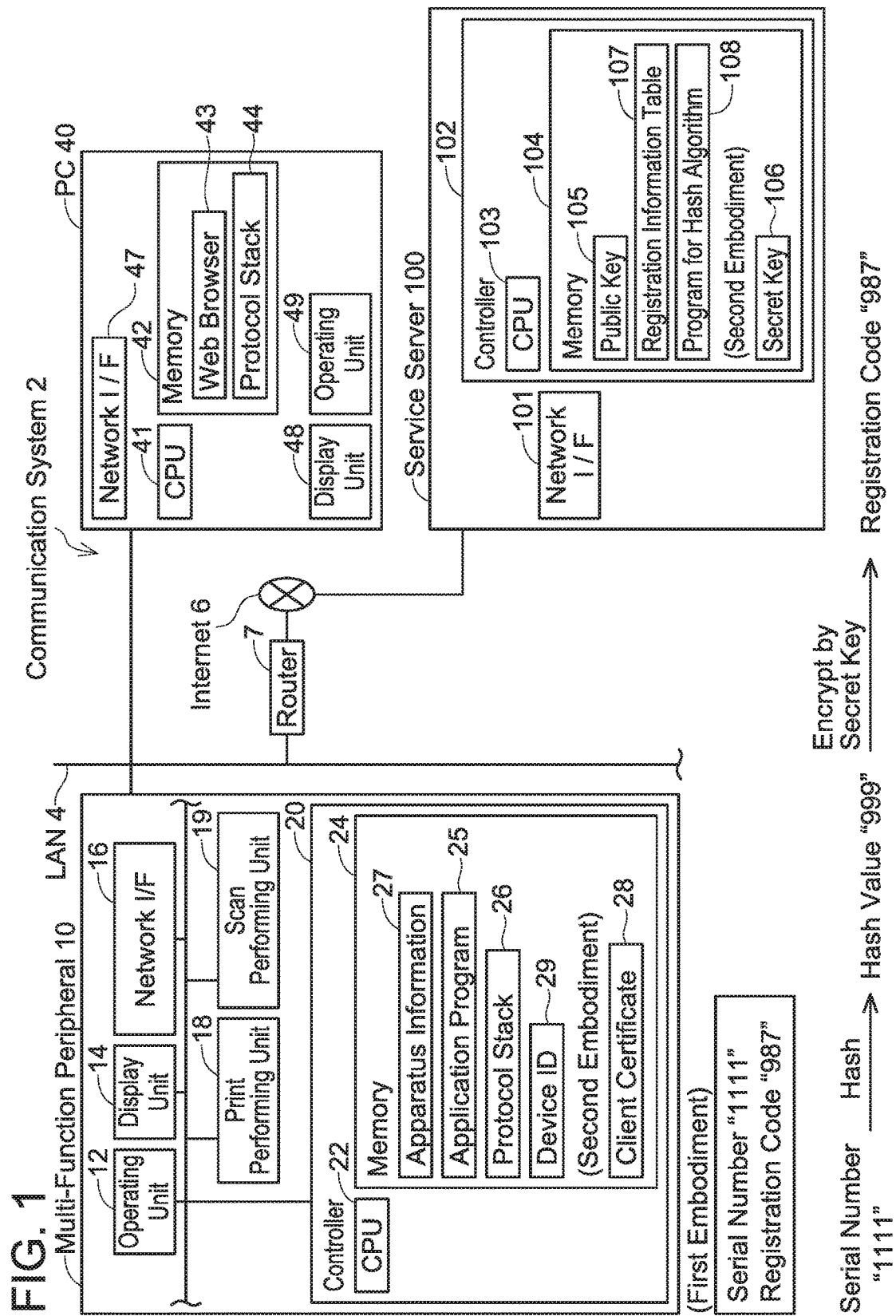
FIG. 1 is a block diagram of a communication system.

EMBODIMENTS (First Embodiment)
<Configuration of Communication System 2>
As shown in FIG. 1, a communication system 2 comprises a router 7, a multi-function peripheral 10, a service server 100, and a PC (also called Personal Computer) 40. The multi-function peripheral 10 is connected to the Internet 6 via a LAN 4 and the router 7. Further, the PC 40 and the service server 100 are also connected to the Internet 6.

<Configuration of Multi-function Peripheral 10>

The multi-function peripheral 10 performs a plurality of functions such as a print function, FAX function, scan function, copy function, etc. The multi-function peripheral 10 comprises an operating unit 12, a display unit 14, a network interface 16, a print performing unit 18, a scan performing unit 19, and a controller 20. The operating unit 12 comprises a plurality of keys. A user can input various instructions to the multi-function peripheral 10 by operating the operating unit 12. The display unit 14 is a display for displaying various information. The network interface 16 is connected to the router 7 via the LAN 4. The network interface 16 is capable of communicating with the service server 100 and the PC 40. The print performing unit 18 comprises printing mechanisms such as an ink jet method, a laser method, etc. The scan performing unit 19 comprises scan mechanisms such as a CCD, CIS, etc. The controller 20 comprises a CPU 22 and a memory 24. The memory 24 may be a computer-readable storage medium. The computer-readable storage medium is a non-transitory medium such as a ROM, RAM, flash memory, hard disk, etc. The ROM, RAM, flash memory, hard disk, etc. are tangible media. An electrical signal conveying a program downloaded from a server on the Internet, or the like, is a type of computer-readable medium but, although being a computer-readable signal medium, is not included in the non-transitory computer-readable storage media. The memory 24 stores an application program 25, a protocol stack 26, apparatus information 27, and a device ID 29.

The apparatus information 27 includes a serial number "1111", model number, node name, MAC address, etc. The serial number "1111" is information unique to the multi-function peripheral 10, e.g., is unique information assigned sequentially to each of the multi-function peripherals 10 by a manufacturer of the multi-function peripheral 10. Since this serial number may be known to the user who bought the multi-function peripheral 10, the serial number may be printed on paper enclosed in a box in which the multi-function peripheral 10 is packaged, and/or may be printed on a seal affixed to the multi-function peripheral 10. Further, the serial number may be printed in a case where the user operates the multi-function peripheral 10 to instruct printing of the apparatus information 27. The model number is information indicating an apparatus type of the multi-function peripheral 10. The node name is information for identifying the multi-function peripheral 10 on a network. The MAC address is a unique physical address assigned for identifying the multi-function peripheral 10 on a network.

The device ID 29 is identification information assigned uniquely to the multi-function peripheral 10, and is information stored only in the memory 24, and not available to the user. Therefore, unlike the serial number, the device ID 29 is not printed on paper enclosed in a box in which the multi-function peripheral 10 is packaged, nor printed on a seal affixed to the multi-function peripheral 10. Further, the user also cannot print the device ID 29 by operating the multi-function peripheral 10.

The CPU 22 executes a process for using various services, to be described later, provided by the service server 100, in accordance with the application program 25 stored in the memory 24. The CPU 22 executes a protocol process such as HTTP (abbreviation of Hyper Text Transfer Protocol), etc. in accordance with the protocol stack 26 stored in the memory 24. By means of the protocol process, the CPU 22 performs establishment of a connection in accordance with HTTP, etc.

At a time when the user purchases the multi-function peripheral 10, paper on which the serial number "1111" and a registration code "987" are written is attached to the multi-function peripheral 10. The paper is enclosed in a packaging container of the multi-function peripheral 10. In a variant, instead of paper, a seal on which the serial number "1111" and the registration code "987" are written may be glued to the multi-function peripheral 10, and/or the serial number "1111" and the registration code "987" may be written on the multi-function peripheral 10 itself. The manufacturer of the multi-function peripheral 10 may enclose the paper or glue the seal when manufacturing the multi-function peripheral 10, or when packing the multi-function peripheral 10 in the packaging container. Further, a retailer of the multi-function peripheral 10 may distribute the paper by handing it to a purchaser of the multi-function peripheral 10. The registration code "987" is generated as follows by the manufacturer of the multi-function peripheral 10. First, a hash value "999" is generated by hashing the serial number "1111" by a hash algorithm. Here, in a case where "1111" is hashed by this hash algorithm, "999" is invariably generated. Further, the hash value "999" is encrypted to the registration code "987" by using a secret key 106 owned by the manufacturer of the multi-function peripheral 10. That is, the registration code "987" is information generated by the owner of the secret key 106 (i.e., the manufacturer), and is information unlikely to have been tampered with by a non-owner of the secret key 106.

Considerations to note in the present specification will be described. In the present specification, it is assumed that the description "the CPU 22 of the multi-function peripheral 10 sends or receives various information" includes a technical content that "the CPU 22 of the multi-function peripheral 10 outputs or obtains various information via the network interface 16". Moreover, a similar consideration is present for each of the PC 40 and the service server 100.

<Configuration of PC 40>

A configuration of the PC 40 will be described. The PC 40 is a device owned by the user of the multi-function peripheral 10. The PC 40 comprises a CPU 41, a memory 42, a network interface 47, a display unit 48, an operating unit 49, etc. The display unit 48 is capable of displaying various information. The operating unit 49 is configured by a keyboard and/or a mouse. The user can input various instructions or information to the PC 40 by operating the operating unit 49. The network interface 47 is connected to the router 7 via the LAN 4. A web browser 43 and a protocol stack 44 are stored in the memory 42. Here, the protocol stack 44 is a program which implements a series of communication protocols in order to realize communication with the PC 40.

The CPU 41 executes processing for using various services, to be described later, provided by the service server 100, in accordance with the web browser 43 stored in the memory 42. The CPU 41 executes a protocol process such as HTTP (abbreviation of Hyper Text Transfer Protocol), etc. in accordance with the protocol stack 44 stored in the memory 42. By means of the protocol process, the CPU 41 performs establishment of a connection in accordance with HTTP, etc.

<Configuration of Service Server 100>

The service server 100 is a server providing an electronic commercial service, and is a server provided by a vendor of the multi-function peripheral 10. Moreover, the manufacturer of the multi-function peripheral 10 may also serve as the vendor. Further, the vendor may be an affiliate of, or a company in partnership with, the manufacturer. The electronic commercial service accepts a selection of goods or a request for various services from the user via the Internet 6. The electronic commercial service is a service for performing payment using a credit card number or the like. The purchased good is mailed to the user.

A configuration of the service server 100 will be described. The service server 100 comprises a network interface 101 and a controller 102. The network interface 101 is connected to the Internet 6. The network interface 101 is capable of communication with the multi-function peripheral 10 and the PC 40. The controller 102 comprises a CPU 103 and a memory 104.

A public key 105, a program for hash algorithm 108 for executing a hash algorithm, and a registration information table 107 are stored in the memory 104. The public key 105 is a key which is publicly accessible and can be obtained by anyone. The public key 105 is a key corresponding to the secret key 106. The secret key 106 is a key owned only by the manufacturer of the multi-function peripheral 10. The registration information table 107 is a table for storing the user information, information of a multi-function peripheral (e.g., 10), and an access token in association. Moreover, "registration" may be expressed as "storage". The information of the multi-function peripheral includes a serial number, device ID, and status information of the multi-function peripheral. Although details will be described later, the status information is information indicating a status of the multi-function peripheral.

(Temporary Registration Process; FIG. 2)

Next, a temporary registration process for storing (i.e., registering) the user information and the serial number "1111" in association in the service server 100 will be described with reference to FIG. 2. In an initial state of FIG. 2, the web browser 43 is activated in the PC 40. Each process of the PC 40 of FIG. 2 is executed by using the web browser 43. In SS, the user performs a login operation in the PC 40 for logging into the service server 100. For example, the user performs an operation to input, to the web browser 43 operating on the PC 40, a URL for requesting login page data to the service server 100. In S10, the CPU 41 of the PC 40 sends a login request to the service server 100.

When receiving the login request from the PC 40, in S12 the CPU 103 of the service server 100 sends the login page data representing a login page to the PC 40. The login page includes an input form for inputting the user information. The user information is information relating to the user, and includes the user ID and a password. The user ID and the password are information determined arbitrarily by the user. The user information further includes a name, address, telephone number, credit card number of the user, e-mail address of the PC 40, etc. Moreover, instead of being input in the login page, the user information except for the user ID and the password may be input to a page provided from the service server 100 after having logged in using the user ID and the password.

In S14, the CPU 41 of the PC 40 causes the display unit 48 to display the login page. In S16, the user inputs the user information to the PC 40. In S20, the CPU 41 of the PC 40 sends the inputted user information to the service server 100.

When receiving the user information from the PC 40, the CPU 103 of the service server 100 sends apparatus registration page data representing an apparatus registration page to the PC 40. The apparatus registration page includes an input form for inputting the serial number "1111" and the registration code "987".

In S24, the CPU 41 of the PC 40 causes the display unit 48 to display the apparatus registration page. In S30, the user inputs the serial number "1111" and the registration code "987" written on the paper accompanying the multi-function peripheral 10, to the PC 40. In S32, the CPU 41 of the PC 40 sends the inputted serial number "1111" and the registration code "987" to the service server 100.

When receiving the serial number "1111" and the registration code "987" from the PC 40, in S33 the CPU 103 of the service server 100 decrypts the received registration code "987" by using the public key 105, obtaining the hash value "999". Further, the serial number "1111" is hashed, generating the hash value "999".

In S34, the CPU 103 of the service server 100 determines whether the value (i.e., "999") into which the received registration code "987" is decrypted, and the hash value (i.e., "999") of the received serial number "1111" are identical. Specifically, the CPU 103 obtains the hash value by hashing the serial number "1111" using the hash algorithm. Next, the CPU 103 determines whether the obtained hash value and the value obtained by decrypting the registration code in S33 are identical. In a case where the user has correctly input the serial number "1111" and the registration code "987" in S30, the CPU 103 of the service server 100 determines YES in S34, and proceeds to S36. In S36, the CPU 103 of the service server 100 stores the user information and the received serial number "1111" in association in the registration information table 107 of the memory 104 and, in S38, sends a registration-success-notification to the PC 40. The registration-success-notification is a notification indicating that registration of the user information and the serial number "1111" succeeded. When S38 ends, the process of FIG. 2 ends.

On the other hand, in a case where, e.g., the user has not correctly input at least one of the serial number "1111" and the registration code "987" in S30, the CPU 103 of the service server 100 determines NO in S34, and proceeds to S40. Further, in a case where, e.g., a person different from the user has input the serial number "1111" and information in which the hash value "999" has been encrypted by using a key different from the secret key 106 (i.e., information different from the registration code "987") in S30, the decryption of S33 fails. In this case, also, the CPU 103 of the service server 100 determines NO in S34, and proceeds to S40.

In S40, the CPU 103 of the service server 100 sends a registration-failure-notification to the PC 40. The registration-failure-notification is a notification indicating that registration of the user information and the serial number "1111" failed. The registration-failure-notification includes the serial number and registration code inputted in S30.

When receiving the registration-failure-notification from the service server 100, in S42 the CPU 41 of the PC 40 displays, on the display unit 48, a screen which includes the serial number and the registration code in the registration-failure-notification, and indicates that registration failed. When S42 ends, the process of FIG. 2 ends.

(Main Registration Process; FIG. 3)

Next, a main registration process for storing (i.e., registering) status information in association with the user information and the serial number "1111" in the service server 100 will be described with reference to FIG. 3. In S110, the user turns ON power of the multi-function peripheral 10.

When the power is turned ON, in S112, the CPU 22 of the multi-function peripheral 10 sends a registration-confirmation-signal including the serial number "1111" and the device ID 29 of the multi-function peripheral 10 to the service server 100. The registration-confirmation-signal is a signal for confirming whether the serial number "1111" is registered in the service server 100.

When receiving the registration-confirmation-signal from the multi-function peripheral 10, in S120 the CPU 103 of the service server 100 determines whether the serial number "1111" in the registration-confirmation-signal has been stored. In a case where the serial number "1111" has been stored, the CPU 103 of the service server 100 proceeds to S122.

In S122, the CPU 103 of the service server 100 generates an access token and, in S124, stores the device ID 29 and the access token in association with the serial number "1111" in the memory 104. Thereby, the user information, the serial number "1111", the device ID 29, and the access token reach a state of being registered in association. In S126, the CPU 103 of the service server 100 sends the access token to the multi-function peripheral 10. In S127, the CPU 22 of the multi-function peripheral 10 stores in the memory 24 the access token received from the service server 100.

Moreover, in a variant, as will be described below, a refresh token may be used. In this variant, in S122 the CPU 103 of the service server 100 generates the refresh token instead of the access token. In S124, the CPU 103 of the service server 100 stores the device ID 29 and the refresh token in association with the serial number "1111" in the memory 104. Then, in S126, the CPU 103 of the service server 100 sends the refresh token to the multi-function peripheral 10. In this case, before executing S132, the multi-function peripheral 10 sends a request instruction of the access token, and the refresh token, to the service server 100. The CPU 103 of the service server 100 performs generation, storage and response of the access token in accordance with the request instruction. The multi-function peripheral executes the process of S132 by using the received access token.

After the CPU 22 of the multi-function peripheral 10 has stored the access token from the service server 100 in the memory 24, in S130 a case is assumed in which a change in status of the multi-function peripheral 10 has occurred. Specifically, the change in status is that a remaining quantity of at least one color of ink, of a plurality of colors of ink with which the multi-function peripheral 10 is provided, has become equal to or below a predetermined value. Moreover, in a variant, it may be determined whether the change in status has occurred by using toner instead of ink. The ink and toner are consumable items with which the multi-function peripheral 10 is provided. Below, a case of black ink will be described, but the case is the same for other colors of ink. For example, a case is assumed in which the predetermined values are 50%, 10%, 5% of a maximum value of a quantity of black ink that can be installed in the multi-function peripheral 10. In this case, a first change in status occurs when the remaining quantity of black ink has, from the state of maximum value, reached 50% of the maximum value, a second change in status occurs when the remaining quantity of black ink has reached 10% of the maximum value, and a third change in status occurs when the remaining quantity of black ink has reached 5% of the maximum value. In S132, each time the change in status occurs, the CPU 22 of the multi-function peripheral 10 sends the status information, the device ID 29, and the access token to the service server 100. The status information is information indicating the remaining quantity of ink of each color. Notably, the device ID 29 is used when sending the status information because this is safer from a security aspect since, unlike the serial number, the device ID is not public information, and reduces the likelihood of a third party identifying the multi-function peripheral 10. In a variant, the status information may be sent periodically, or may be sent each time printing is executed.

When receiving the status information, the device ID 29 and the access token, in S138 the CPU 103 of the service server 100 stores, in the memory 104, the status information in association with the serial number "1111". Thereby, the user information, the serial number "1111", the device ID 29, the access token, and the status information reach a state of being registered in association.

In S140, the CPU 103 of the service server 100 determines whether an order of any color of ink is needed. The CPU 103 of the service server 100 determines YES in S140, and proceeds to S142 in a case where the remaining quantity of at least one color of ink is equal to or below a specified value, and returns to a standby state of waiting to receive information sent in S132 in a case where the remaining quantities of ink of all the colors are greater than the specified value. Below, a case of black ink will be described, but the case is the same for other colors of ink. For example, a case is assumed in which the predetermined values are 50%, 10%, 5% of the maximum value of the quantity of black ink that can be installed, and the specified value is 5% of the maximum value of the quantity of black ink that can be installed. In this case, NO is determined in S140 in a case where the status information that are sent at the first and second times are received, and YES is determined in S140 in a case where the status information sent at the third time is received.

In S142, the CPU 103 of the service server 100 specifies an e-mail address of the PC 40 as a destination, and sends an e-mail instructing the user to order ink of the color determined by YES in S140. The e-mail includes a message instructing the user to order the ink, and a URL (abbreviation of Uniform Resource Locator) indicating a web page for ordering the ink. The user can access the web page and order the ink. Moreover, the e-mail address of the PC 40 is included in the user information stored in S35 of FIG. 2. When S142 ends, the process of FIG. 3 ends.

On the other hand, in a case of determining that the serial number "1111" has not been stored in S120, the CPU 103 of the service server 100 proceeds to S150. In S150, the CPU 103 of the service server 100 sends an unregistration notification indicating that the serial number "1111" is unregistered, to the multi-function peripheral 10.

When receiving the unregistration notification from the service server 100, in S152 the CPU 22 of the multi-function peripheral 10 causes the display unit 14 to display an unregistration screen indicating that the serial number "1111" is unregistered. When S152 ends, the process of FIG. 3 ends.

<Conventional Configuration>

First, a conventional configuration (called "comparative embodiment" below) different from the first embodiment will be described with reference to FIG. 6A. In the comparative embodiment, a pass phrase, instead of the registration code "987" is written on paper. The pass phrase is a unique character string generated randomly by the service server 100, and is information that can be obtained only by the purchaser of the multi-function peripheral 10. That is, the pass phrase is authentication information for certifying that this is the purchaser of the multi-function peripheral 10. For the pass phrase to function as the authentication information, it is necessary for the service server 100 to store the serial number "1111" and the pass phrase in association in advance in the memory 104. In S30 of FIG. 2, the user inputs the pass phrase written on the paper and the serial number "1111". When receiving the serial number "1111" and the pass phrase from the PC 40, the service server 100 determines whether a set of the received serial number "1111" and the pass phrase has been stored in the memory 104. In a case where the set has been stored, it is determined that certification has succeeded. Then, the service server 100 registers the user information and the serial number "1111" in association in the registration information table 107.

On the other hand, in a case where the set of the received serial number "1111" and the pass phrase has not been stored in the memory 104, the service server 100 determines that certification has failed, and does not register the user information in the registration information table 107. Thus, in the comparative embodiment, since the service server 100 stores the serial number "1111" and the pass phrase in association in advance, security is ensured when the user information is to be registered in the registration information table 107 in association with the serial number "1111". Moreover, in considering a case of storing user information and serial number in association for not only the multi-function peripheral 10 but for a plurality of multi-function peripherals, it is necessary to store a set of the serial number and the pass phrase in advance in the memory 104 for each of the plurality of multi-function peripherals. Therefore, in the comparative embodiment, there is the problem that a memory load of the service server 100 increases.

<Effect of First Embodiment>

On the other hand, in the present embodiment, the service server 100 receives the serial number "1111", the registration code "987", and the user information from the PC 40 (S20, S32 of FIG. 2). The service server 100 determines whether the hash value (i.e., "999") into which the registration code "987" is decrypted using the public key 105, and the hash value (i.e., "999") of the serial number "1111" are identical (S34). That is, the service server 100 determines whether the hash value (i.e., "999") into which the registration code "987" is decrypted using the public key 105 represents the same information as the serial number "1111". In case of determining that the hash value "999" and the serial number "1111" represent the same information (YES in S34), the service server 100 determines that certification succeeded. Then, the service server 100 stores the user information in association with the serial number "1111" in the registration information table 107 (S36). Here, as with the pass phrase of the comparative embodiment, the registration code "987" of the present embodiment is information which can be obtained only by the user of the multi-function peripheral 10. That is, the registration code "987" functions as authentication information. Therefore, by the service server 100 determining whether the hash value "999" basing on the registration code "987", and the serial number "1111" represent the same information, user authentification is executed. Therefore, it is possible to prevent the user information from accidentarily being stored in the service server 100 in association with a serial number of another image forming device that is not the intended multi-function peripheral 10. However, unlike the pass phrase of the comparative embodiment, the registration code "987" of the present embodiment is not generated randomly. The registration code "987" is information generated using the serial number "1111" and the secret key 106. Therefore, it is not necessary for the service server 100 to store a large quantity of sets of serial number and pass phrase in the memory 104, as shown in the comparative embodiment of FIG. 6A. As shown in FIG. 6B, it is only necessary to store the public key 105. Thereby, in the technique of the present embodiment, it is possible to reduce the load on the memory of the service server 100.

In the present embodiment, information obtained by encrypting the hash value "999" obtained by hashing the serial number "1111", is the registration code "987". Since hashing is a process of compressing original data and converting it into fixed length data, the hash value "999" has a smaller data size than the serial number "1111". Consequently, it is possible to reduce the communication load of the service server 100 when receiving the registration code "987".

In the present embodiment, the service server 100 can send the serial number and the registration code received in S32 to the PC 40 (S40 of FIG. 2). Thereby, the PC 40 can cause the display unit 48 to display the serial number and the registration code (S42). By looking at the displayed serial number and the registration code, the user can confirm that at least one of the serial number and the registration code is incorrect, that at least one has been input wrongly, etc.

In the present embodiment, the registration code "987" is information that has been encrypted using the secret key 106, and is information which is unlikely to have been tampered with by a person not having the secret key 106. Therefore, security is increased when the user information and the serial number "1111" are stored in association in the service server 100.

In the present specification, the service server 100 can receive the status information from the multi-function peripheral 10 (S132) in a case where information the same as the received serial number "1111" is being stored in the memory 104 (YES in S120 of FIG. 3). The serial number "1111" being stored in the memory 104 is stored when there was an affirmative determination in S34 of FIG. 2. Therefore, since the service server 100 receives the status information when it has been confirmed that the sending source that sent the status information is the regular multi-function peripheral 10, security when receiving the status information improves.

In the present embodiment, the service server 100 can send the unregistration notification, indicating that information the same as the serial number "1111" received in S112 of FIG. 3 is not being stored, to the multi-function peripheral 10 (S150). Thereby, the multi-function peripheral 10 can display the unregistration screen (S152). By looking at the unregistration screen, the user can confirm that information the same as the serial number "1111" is not being stored.

In the present embodiment, the service server 100 can instruct the user to order ink in response to the remaining quantity of ink.

In the present embodiment, based on the access token, the service server 100 can safely execute communication of the status information.

(Second Embodiment)

In the present embodiment, paper on which the serial number and the registration code are written does not accompany the multi-function peripheral 10. Instead, the multi-function peripheral 10 stores the serial number "1111" in advance in the memory 24. Further, the multi-function peripheral 10 receives a registration code from the service server 100. Further, the registration code of the present embodiment is different from the registration code of the first embodiment.

As shown in FIG. 1, in the present embodiment, a client certificate 28 is written in advance in the memory 24 of the multi-function peripheral 10 by the manufacturer of the multi-function peripheral 10. The client certificate 28 is information for certifying that the multi-function peripheral 10 has been provided by this manufacturer. The client certificate 28 includes an electric signature encrypted using a secret key of a certification authority.

Further, the secret key 106 for generating the registration code generated by the service server 100 is stored in the memory 104 of the service server 100 in the present embodiment.

(Registration Code Receiving Process; FIGS. 4A, 4B)

Next, a registration code receiving process for the multi-function peripheral 10 to receive the registration code will be described with reference to FIGS. 4A and 4B. In the present process, the CPU 22 of the multi-function peripheral 10 performs an SSL communication with the service server 100 in accordance with an SSL (abbreviation of Secure Socket Layer) protocol. The SSL communication is a communication executed using the client certificate 28 (FIG. 1) stored in the memory 24 of the multi-function peripheral 10. Since the client certificate 28 is a certificate issued by a certification authority with high reliability, high security is ensured in the SSL communication. In S210, the user executes a code-obtaining-operation, on the multi-function peripheral 10, for obtaining the registration code. In order to perform an SSL (abbreviation of Secure Socket Layer) communication with the service server 100, the CPU 22 of the multi-function peripheral 10 sends an access request to the service server 100 by using an https connection. In response to the access request from the multi-function peripheral 10, the CPU 103 of the service server 100 requests the client certificate 28 from the multi-function peripheral 10. In S212, the CPU 22 of the multi-function peripheral 10 sends a code request including the serial number "1111" and the client certificate 28 to the service server 100. The electric signature encrypted using the secret key of the certification authority, and a public key of the certification authority are included in the client certificate 28.

When receiving the code request from the multi-function peripheral 10, in S213 the CPU 103 of the service server 100 executes certification by using the client certificate 28 in the code request. Specifically, the CPU 103 of the service server 100 attempts to decrypt the electric signature included in the client certificate 28 by using the public key of the certification authority.

In S214, the CPU 103 of the service server 100 determines whether the certification of S213 succeeded. In a case where the electric signature included in the client certificate 28 was decrypted by using the public key of the certification authority, the CPU 103 of the service server 100 determines YES in S214, and proceeds to S216. In this case, it is confirmed that the electric signature was encrypted by using the secret key of the certification authority, i.e., that the client certificate 28 is a certificate issued by the manufacturer.

In S216, the CPU 103 of the service server 100 generates a registration code "1234987". Specifically, the CPU 103 of the service server 100 generates the hash value "999" by hashing the serial number "1111" by using the hash algorithm (see FIG. 4B). Then, the serial number "1111" and the hash value "999" are combined to generate a composite character string "1111999". Next, the generated composite character string "1111999" is encrypted to the registration code "1234987" by using the secret key 106.

That is, the registration code "1234987" is information generated by the owner of the secret key 106 (i.e., the manufacturer), and is information unlikely to be tampered with by a person not having the secret key 106. In S220, the CPU 103 of the service server 100 sends the generated registration code "1234987" to the multi-function peripheral 10.

When receiving the registration code "1234987" from the service server 100, in S222 the CPU 22 of the multi-function peripheral 10 causes the print performing unit 18 to print the registration code "1234987". The user can learn the registration code "1234987" by looking at the printed registration code "1234987". When S222 ends, the process of FIG. 4A ends.

On the other hand, in a case where the electric signature included in the client certificate 28 could not be decrypted by using the public key 105, the CPU 103 of the service server 100 determines NO in S214, and proceeds to S230. In this case, it is confirmed that the electric signature has not been encrypted using the secret key 106, i.e., that the client certificate 28 is not a certificate issued by the manufacturer. In S230, the CPU 103 of the service server 100 sends, to the multi-function peripheral 10, a certification-failure-notification indicating that certification of S213 failed. In this case, the CPU 22 of the multi-function peripheral 10 does not cause the print performing unit 18 to print the registration code "1234987". When S230 ends, the process of FIG. 4A ends.

(Temporary Registration Process; FIG. 5)

Next, a temporary registration process of a second embodiment will be described with reference to FIG. 5. S308 to S324 are similar to S8 to S24 of FIG. 2. However, an input form of S324 does not include a form for inputting a serial number. In S330, the user inputs the registration code "1234987" to the PC 40. Here, it is assumed that the registration code receiving process of FIG. 4A is executed before S330 is executed, and that the user knows the registration code "1234987" in advance.

In S332, the CPU 41 of the PC 40 sends the inputted registration code "1234987" to the service server 100.

When receiving the registration code "1234987" from the PC 40, in S333 the CPU 103 of the service server 100 decrypts the received registration code "1234987" by using the public key 105, obtaining the composite character string "1111999". The composite character string "1111999" is divided into the serial number "1111" and the hash value "999".

In S334, the CPU 103 of the service server 100 determines whether a value into which a part "987" of the received registration code is decrypted, and a hash value into which a part "1234" of the received registration code is decrypted, are identical. In a case where the user has correctly input the registration code "1234987" in S330, the CPU 103 of the service server 100 determines YES in S334, and proceeds to S336. In S336, the CPU 103 of the service server 100 stores the user information and the serial number "1111" obtained by decrypting the registration code in association in the registration information table 107, and proceeds to S338. S338 is the same as S38 of FIG. 2. When S338 ends, the process of FIG. 5 ends. On the other hand, in a case where e.g., the user has not correctly input the registration code "1234987" in S330, the CPU 103 of the service server 100 determines NO in S334, and proceeds to S340. Further, in a case where, e.g., a person different from the user has input information into which the serial number "1111" and the hash value "999" are encrypted (i.e., information different from the registration code "1234987") by using a key different from the secret key 106 in S330, the decryption of S333 fails. In this case, the CPU 103 of the service server 100 determines NO in S334, and proceeds to S340.

In S340, the CPU 103 of the service server 100 sends the registration-failure-notification to the PC 40. The registration-failure-notification includes the registration code inputted in S330.

When receiving the registration-failure-notification from the service server 100, in S342 the CPU 41 of the PC 40 displays the registration code in the registration-failure-notification on the display unit 48. When S342 ends, the process of FIG. 5 ends.

A main registration process of the second embodiment is the same as the main registration process of the first embodiment, and consequently a description thereof is omitted.

<Effect of Second Embodiment>

In the present embodiment, the service server 100 receives the registration code "1234987" and the user information from the PC 40 (S320, S332 of FIG. 2). The service server 100 determines whether the serial number "1111" into which the registration code "1234987" is decrypted using the public key 105 represents the same information as the hash value "999". In case of determining that the serial number "1111" and the hash value "999" represent the same information (YES in S334 of FIG. 5), the server apparatus stores the user information and the serial number "1111" in association (S336). Here, as with the pass phrase of the comparative embodiment, the registration code "1234987" of the present embodiment is information which can be obtained only by the user of the multi-function peripheral 10. That is, the registration code "1234987" functions as authentication information. Therefore, the service server 100 becomes able to execute user certification by determining whether the serial number "1111" obtained from the registration code "1234987", and the hash value "999" obtained from the registration code "1234987", represent the same information. Therefore, it is possible to prevent the user information from being associated accidentally and stored with a serial number of another image forming device that is not the intended multi-function peripheral 10. Security when associating and storing the serial number "1111" in the registration information table 107 is ensured. Further, as with the first embodiment, it is not necessary for the service server 100 to store a large quantity of sets of serial number and pass phrase in the memory 104, and consequently it is possible to reduce the memory load of the service server 100. Further, in the present embodiment, since the composite character string "1111999" is encrypted to generate the registration code "1234987", it is possible to cause the serial number to be within the registration code "1234987". Therefore, it is not necessary to input the serial number "1111" in S330 of FIG. 5. The input process for inputting the registration code "1234987" may be performed only once. Thereby, it is possible to reduce the number of times of executing the input process compared to a case where an input process for the registration code and an input process for the serial number are performed in two input processes. That is, it is possible to reduce the inputting load of the user.

In the present embodiment, the service server 100 can send the registration code received in S332 to the PC 40 (S340 of FIG. 5). Thereby, the PC 40 can cause the display unit 48 to display the registration code (S342). By looking at the displayed registration code, the user can confirm that the registration code is unauthorized, the registration code has been input wrongly, etc.

In the present embodiment, the registration code "1234987" is information that was encrypted using the secret key 106, and is information unlikely to be tampered with by a person not having the secret key 106. Therefore, security is increased when the user information and the serial number "1111" are stored in association in the service server 100.

In the present embodiment, the service server 100 can send, to the multi-function peripheral 10, the unregistration notification indicating that information the same as the serial number "1111" received in S112 of FIG. 3 is not being stored (S150). Thereby, the multi-function peripheral 10 can display the unregistration screen (S152). By looking at the unregistration screen, the user can confirm that information the same as the serial number "1111" is not being stored.

In the present embodiment, the service server 100 can instruct the user to order ink in response to the remaining quantity of ink.

In the present embodiment, based on the access token, the service server 100 can safely execute communication of the status information.

In the present embodiment, the service server 100 can send the registration code "1234987" to the multi-function peripheral 10.

Specific examples of the present disclosure are described above in detail, but these examples are merely illustrative and place no limitation on the scope of the patent claims. The technology described in the patent claims also encompasses various changes and modifications to the specific examples described above. Modifications to the above embodiments are described below.

(Modification)

In the illustrative examples of the present specification, the serial number is described as an example of information capable of uniquely identifying the multi-function peripheral 10. However, the configuration is not limited to this. Any other type of information may be used as long as the information is capable of uniquely identifying the multi-function peripheral 10. For example, other information of the multi-function peripheral 10 (e.g., MAC address, etc.) may be used. Further, the registration code may be information based on that other information instead of on the serial number "1111". Further, in S36, the service server 100 may store that other information instead of the serial number "1111". That is, the "unique information" is not limited to the serial number "1111", but may be a MAC address, etc.

The second embodiment includes the technique of "causing the serial number "1111" to be within the registration code "1234987"", and the technique of the registration code receiving process of FIG. 4A. These techniques may be realized not in combination, but alone respectively. Specifically, the processes of S210 to S230 of FIG. 4A may be omitted. Further, the registration code "1234987" may be written on paper accompanying the multi-function peripheral 10. In another variant, the registration code received in the registration code receiving process may be the registration code "987".

The "information processing apparatus" is not limited to a stationary device such as a PC, but may be a portable device such as a mobile telephone. That is, the "information processing apparatus" includes any device capable of executing information processing.

The "image processing apparatus" is not limited to the multi-function peripheral, but may be a digital camera capable of generating image data representing a photograph, a PC capable of executing an image editing process, etc. That is, the "image processing apparatus" includes any apparatus capable of executing image processing.

Instead of the hash algorithm, e.g., a compression function algorithm may be used. Further, the method of generating the hash value "999" from the serial number "1111" may be a method not using this hash algorithm (e.g., a method using a compression function algorithm). That is, any method may be used as long as it always generates a fixed value relative to an original value and, if the original value is different, a different value is always generated.

In the aforementioned embodiments, a common key may be used instead of the public key 105 and the secret key 106. In this case, only the manufacturer of the multi-function peripheral 10 has the common key. The registration code is information encrypted using the common key, and is information unlikely to have been tampered with by a person not having the common key. Therefore, security improves when storing the user information and the serial number "1111" in association in the service server 100.

In the aforementioned embodiments, the service server 100 may periodically receive the registration-confirmation-signal from the multi-function peripheral 10 in S112 of FIG. 3. That is, the "predetermined condition" may be that a predetermined time has elapsed since unique information was last received.

In the aforementioned embodiments, the change in status of S130 of FIG. 3 may be that a cover of the multi-function peripheral 10 for setting a document has been in an open state for a certain period or longer, and the status information may be information indicating that the cover has been in the open state for the certain period or longer. In this case, instead of S140, S142, the service server 100 may send information to the multi-function peripheral 10 instructing the user to close the cover. Further, in another variant, the change in status of S130 of FIG. 3 may be that printing paper with which the multi-function peripheral 10 is provided has reached a predetermined quantity or less, and the status information may be information indicating that the printing paper has reached the predetermined quantity or less. In this case, instead of S140, S142, the service server 100 may send information to the multi-function peripheral 10 instructing the user to order printing paper. That is, the "target information" may be any information indicating the status of the image processing apparatus, and the "target process" may be any process in accordance with the target information.

The service server 100 may include a plurality of physically independent servers. That is, the service server 100 may include a web server (so-called BOL) for executing processing related to login (see FIG. 2, FIG. 5), an information collecting server (so-called BOC) for receiving various information from the multi-function peripheral 10 (see S112 to S138 of FIG. 3), and an order server (so-called SCP server) for determining whether ordering of ink is needed (see S140, S142 of FIG. 3).

In the first embodiment, the registration code "987" is written on paper accompanying the multi-function peripheral 10. Instead, as in FIG. 4A of the second embodiment, the service server 100 may generate the registration code "987" by using the serial number "1111" received from the multi-function peripheral 10. Then, the multi-function peripheral 10 may receive the registration code "987" from the service server 100.

In the aforementioned embodiments, the CPUs 22, 41, 103 of each device 10, 40, 100 perform the processes of FIG. 2 to FIG. 5 by executing programs within the memories 24, 42, 104. Instead, at least one process of the processes of FIG. 2 to FIG. 5 may be performed by hardware such as a logic circuit.

The service server 100, the PC 40, the multi-function peripheral 10 are an example of "a server apparatus", "an information processing apparatus" and "an image processing apparatus", respectively. The memory 104 is an example of "a memory". The serial number "1111", the hash value "999" of the first embodiment, and the status information are an example of "unique information", "decrypted information", and "target information", respectively. The hash value "999" is an example of "additional information". The registration code "987" of the first embodiment, and the registration code "1234987" of the second embodiment are examples of "encrypted information". The secret key 106 and the public key 105 are an example of "a first key" and "a second key", respectively. The process of S142 of FIG. 3 is an example of "target process". The power of the multi-function peripheral 10 being turned ON is an example of "a predetermined condition".

S32 of FIG. 2 and S332 of FIG. 5 are examples of "receiving unique information, encrypted information and user information". S33 of FIG. 2 and S333 of FIG. 5 are examples of "decrypting the received encrypted information". S34 of FIG. 2 and S334 of FIG. 5 are examples of "determining whether the decrypted information and the received unique information represent same information". S36 of FIG. 2 and S336 of FIG. 5 are examples of "storing, in the memory, the received user information and unique information in association". S40 of FIG. 2 and S340 of FIG. 5 are examples of "sending the received encrypted information". S12, S120, S132, S150, S126 of FIG. 3, S212, S216, S220 of FIG. 4 are an example of "receiving the unique information", "determining whether same information as the received unique information is stored in the memory", "receiving target information", "sending, to the image processing apparatus, information indicating that the same information as the received unique information is not stored in the memory", "sending an access token", "receiving the unique information and an electronic certificate", "encrypting the received unique information into the encrypted information" and "sending the encrypted information.

What is claimed is:

1. A server apparatus comprising:
 a network interface configured to execute a communication with an information processing apparatus and an image processing apparatus;
 a processor; and
 a memory storing computer-readable instructions therein, the computer-readable instructions, when executed by the processor, causing the server apparatus to perform:
  receiving unencrypted unique information, encrypted information and user information from the information processing apparatus via the network interface, the unencrypted unique information uniquely identifying the image processing apparatus and functioning as a first verification code, the encrypted information being information into which the unique information is encrypted using a first key, and the user information being information related to a user of the image processing apparatus;
  decrypting the received encrypted information using a second key corresponding to the first key so as to obtain the unique information, wherein the unique information, obtained by decrypting the received encrypted information, functions as a second verification code, wherein the user information is different from both of the first key and the second key;
  determining whether the unencrypted unique information functioning as the first verification code and the decrypted unique information functioning as the second verification code match; and storing, in the memory, the received user information and the received unique information in association in a case where it is determined that the unencrypted unique information functioning as the first verification code and the decrypted unique information functioning as the second verification code match.

2. The server apparatus as in claim 1, wherein the computer-readable instructions, when executed by the processor, cause the server apparatus to further perform:

sending the received encrypted information to the information processing apparatus in a case where it is determined that the unencrypted unique information functioning as the first verification code and the decrypted unique information functioning as the second verification code do not match.

3. The server apparatus as in claim 1, wherein:
the first key is a secret key, and
the second key is a public key.

4. The server apparatus as in claim 1, wherein the first key and the second key are common keys.

5. The server apparatus as in claim 1, wherein the computer-readable instructions, when executed by the processor, cause the server apparatus to further perform:

receiving the unique information from the image processing apparatus via the network interface in response to satisfaction of a predetermined condition;

determining whether information matching the unique information received from the image processing apparatus in response to satisfaction of the predetermined condition is stored in the memory; and receiving target information from the image processing apparatus via the network interface in a case where it is determined that information matching the unique information received from the image processing apparatus in response to satisfaction of the predetermined condition is stored in the memory, the target information being information indicating a status of the image processing apparatus.

6. The server apparatus as in claim 5, wherein the computer-readable instructions, when executed by the processor, cause the server apparatus to further perform in a case where it is determined that information matching the unique information received from the image processing apparatus in response to satisfaction of the predetermined condition is not stored in the memory, sending, to the image processing apparatus, information indicating that information matching the unique information received from the image processing apparatus in response to satisfaction of the predetermined condition is not stored in the memory.

7. The server apparatus as in claim 5, wherein the computer-readable instructions, when executed by the processor, cause the server apparatus to further perform executing a target process in accordance with the received target information.

8. The server apparatus as in claim 7, wherein:
the target information is information indicating a remaining quantity of a consumable item with which the image processing apparatus is provided, and the target process is sending, to an external apparatus, information for instructing the user to order the consumable item.

9. The server apparatus as in claim 5, wherein:
the computer-readable instructions, when executed by the processor, cause the server apparatus to further perform sending an access token to the image processing apparatus in the case where it is determined that the same information as the unique information received from the image processing apparatus in response to satisfaction of the predetermined condition is stored in the memory, and the target information is sent from the image processing apparatus based on the sent access token.

10. The server apparatus as in claim 1, wherein:
the memory is configured to store the first key, and
the computer-readable instructions, when executed by the processor, cause the server apparatus to further perform:

receiving the unique information and an electronic certificate via the network interface from the image processing apparatus, the electronic certificate being information stored in the image processing apparatus by a manufacturer of the image processing apparatus and information for certifying that the image processing apparatus is provided by the manufacturer;

encrypting the received unique information into the encrypted information using the first key in response to receiving the unique information and the electronic certificate; and sending the encrypted information to the image processing apparatus via the network interface.

11. The server apparatus as in claim 1, wherein:
the decrypted unique information functioning as the second verification code is a second hash value into which the unique information is hashed by a hash algorithm,
the determining includes:
hashing the unencrypted unique information that is received in the receiving and functions as the first verification code into a first hash value by the hash algorithm; and determining whether the first hash value and the second hash value are identical.

12. A server apparatus comprising:
a network interface configured to execute a communication with an information processing apparatus and an image processing apparatus;
a processor; and
a memory storing computer-readable instructions therein, the computer-readable instructions, when executed by the processor, causing the server apparatus to perform:
receiving encrypted information and user information from the information processing apparatus via the network interface, the encrypted information being information into which unique information and additional information are encrypted together using a first key, the unique information being information which uniquely identifies the image processing apparatus, the unique information functioning as a first verification code, the additional information functioning as a second verification code and the user information including identifying information of a user of the image processing apparatus;

decrypting the received encrypted information using a second key corresponding to the first key so as to obtain the unique information and the additional information, wherein the user information is different from both of the first key and the second key;

determining whether the unique information functioning as the first verification code and the additional information functioning as the second verification code match; and storing, in the memory, the received user information and the decrypted unique information in association in a case where it is determined that the unique information functioning as the first verification code and the additional information functioning as the second verification code match.

13. The server apparatus as in claim 12, wherein:
the additional information functioning as the second verification code is a second hash value into which the unique information is hashed by a hash algorithm, and
the determining includes:
hashing the decrypted unique information that is obtained by the decrypting of the received encrypted information and functions as the first verification code into a first hash value by the hash algorithm; and
determining whether the first hash value and the second hash value are identical.

14. The server apparatus as in claim 12, wherein
the computer-readable instructions, when executed by the processor, cause the server apparatus to further perform
sending the received encrypted information to the information processing apparatus in a case where it is determined that the unique information functioning as the first verification code and the additional information functioning as the second verification code do not match.

15. The server apparatus as in claim 12, wherein:
the first key is a secret key, and
the second key is a public key.

16. The server apparatus as in claim 12, wherein
the first key and the second key are common keys.

17. The server apparatus as in claim 12, wherein
the computer-readable instructions, when executed by the processor, cause the server apparatus to further perform:
receiving the unique information from the image processing apparatus via the network interface in response to satisfaction of a predetermined condition;
determining whether information matching the unique information received from the image processing apparatus in response to satisfaction of the predetermined condition is stored in the memory; and
receiving target information from the image processing apparatus via the network interface in a case where it is determined that information matching the unique information received from the image processing apparatus in response to satisfaction of the predetermined condition is stored in the memory, the target information being information indicating a status of the image processing apparatus.

18. The server apparatus as in claim 17, wherein
the computer-readable instructions, when executed by the processor, cause the server apparatus to further perform:
in a case where it is determined that same information as the unique information received from the image processing apparatus in response to satisfaction of the predetermined condition is not stored in the memory, sending, to the image processing apparatus, information indicating that the same information as the unique information received from the image processing apparatus in response to satisfaction of the predetermined condition is not stored in the memory.

19. The server apparatus as in claim 17, wherein
the computer-readable instructions, when executed by the processor, cause the server apparatus to further perform:
executing a target process in accordance with the received target information.

20. The server apparatus as in claim 19, wherein:
the target information is information indicating a remaining quantity of a consumable item with which the image processing apparatus is provided, and
the target process is sending, to an external apparatus, information for instructing the user to order the consumable item.

21. The server apparatus as in claim 17, wherein:
the computer-readable instructions, when executed by the processor, cause the server apparatus to further perform
sending an access token to the image processing apparatus in the case where it is determined that information matching the unique information received from the image processing apparatus in response to satisfaction of the predetermined condition is stored in the memory, and
the target information is sent from the image processing apparatus based on the sent access token.

22. The server apparatus as in claim 12, wherein
the memory is configured to store the first key, and
the computer-readable instructions, when executed by the processor, cause the server apparatus to further perform:
receiving the unique information and an electronic certificate via the network interface from the image processing apparatus, the electronic certificate being information stored in the image processing apparatus by a manufacturer of the image processing apparatus and information for certifying that the image processing apparatus is provided by the manufacturer;
encrypting the received unique information into the encrypted information using the first key in response to receiving the unique information and the electronic certificate; and
sending the encrypted information to the image processing apparatus via the network interface.

23. A communication system comprising a server apparatus, an information processing apparatus and an image processing apparatus, the server apparatus comprising:
a network interface configured to execute a communication with the information processing apparatus and the image processing apparatus;
a processor; and
a memory storing computer-readable instructions therein, the computer-readable instructions, when executed by the processor, causing the server apparatus to perform:
receiving unencrypted unique information, encrypted information and user information from the information processing apparatus via the network interface, the unique information uniquely identifying the image processing apparatus, the unencrypted unique information functioning as a first verification code, the encrypted information being information into which the unique information is encrypted using a first key, and the user information being information related to a user of the image processing apparatus;
decrypting the received encrypted information using a second key corresponding to the first key so as to obtain the unique information, wherein the unique information, obtained by decrypting the received encrypted information, functions as a second verification code, wherein the user information is different from both of the first key and the second key;

determining whether the unencrypted unique information functioning as the first verification code and the decrypted unique information functioning as the second verification code match; and storing, in the memory, the received user information and the received unique information in association in a case where it is determined that the unencrypted unique information functioning as the first verification code and the decrypted unique information functioning as the second verification code match.

24. A communication system comprising a server apparatus, an information processing apparatus and an image processing apparatus, the server apparatus comprising:

a network interface configured to execute a communication with the information processing apparatus and the image processing apparatus;

a processor; and a memory storing computer-readable instructions therein, the computer-readable instructions, when executed by the processor, causing the server apparatus to perform:

receiving encrypted information and user information from the information processing apparatus via the network interface, the encrypted information being information into which unique information and additional information are encrypted together using a first key, the unique information uniquely identifying the image processing apparatus, the unique information functioning as a first verification code, the additional information functioning as a second verification code, and the user information including identifying information of a user of the image processing apparatus;

decrypting the received encrypted information using a second key corresponding to the first key so as to obtain the unique information and the additional information, wherein the user information is different from both of the first key and the second key;

determining whether the unique information functioning as the first verification code and the additional information functioning as the second verification code match; and storing, in the memory, the received user information and the decrypted unique information in association in a case where it is determined that the unique information functioning as the first verification code and the additional information functioning as the second verification code match.

* * * * *